United States Patent [19]

Birkmeyer

[11] 4,299,747

[45] Nov. 10, 1981

[54] REACTION PRODUCTS OF A POLYGLYCIDYL ETHER OF A POLYPHENOL AND AN AMINO ACID AND AQUEOUS SOLUBILIZED PRODUCTS THEREFROM

[75] Inventor: William J. Birkmeyer, Oakmont, Pa.

[73] Assignee: PPG Industries, Inc., Pittsburgh, Pa.

[21] Appl. No.: 775,490

[22] Filed: Mar. 8, 1977

[51] Int. Cl.$^3$ .................... C08L 63/02; C08K 5/09; C08K 5/18; C08J 3/06

[52] U.S. Cl. .................... 260/29.6 NR; 260/29.3; 260/29.2 EP; 260/29.4 UA; 525/113; 525/504; 525/533; 525/917; 528/99; 528/113; 528/114; 562/453; 525/109; 525/110

[58] Field of Search .................... 260/29.2 EP, 29.4 R, 260/29.6 NR

[56] References Cited

U.S. PATENT DOCUMENTS

| | | | |
|---|---|---|---|
| 3,479,310 | 11/1969 | Dieterich et al. | 260/29.2 TN |
| 3,839,252 | 10/1974 | Bosso et al. | 260/29.2 EP |
| 3,928,156 | 12/1975 | Wismer et al. | 260/29.2 EP |
| 3,945,952 | 3/1976 | Fujimoto et al. | 260/29.2 EP |
| 4,119,609 | 10/1978 | Allen et al. | 260/29.2 EP |

FOREIGN PATENT DOCUMENTS 1204862 9/1970 United Kingdom .
1448134 9/1976 United Kingdom .

OTHER PUBLICATIONS

Astle et al., "Organic Chemistry" IInd ed., 1959, pp. 315 & 316.

Primary Examiner—Paul Lieberman
Assistant Examiner—Arthur H. Koeckert
Attorney, Agent, or Firm—William J. Uhl

[57] ABSTRACT

Coating compositions which may be applied by conventional techniques as well as by electrodeposition are provided by reacting a polyglycidyl ether of a polyphenol with an amino acid containing at least one amine group and one carboxyl group, wherein the amine group of the acid is preferentially reactive with the epoxy groups of the polyglycidyl ether. The resultant product can then be solubilized by neutralizing at least a portion of the acid functionality thereof with an amine or other base. Especially useful amino acids are the aminobenzoic acids.

19 Claims, No Drawings

REACTION PRODUCTS OF A POLYGLYCIDYL ETHER OF A POLYPHENOL AND AN AMINO ACID AND AQUEOUS SOLUBILIZED PRODUCTS THEREFROM

BACKGROUND OF THE INVENTION

As a result of the increased emphasis by Federal and State governments in combating air pollution, the coatings industry is expending considerable effort in eliminating or at least substantially minimizing the emission of solvent vapors to the atmosphere from coating compositions. As a part of this effort, the coatings industry has launched a major effort to develop aqueous or water-based coating compositions in which organic solvents have been completely eliminated or in which the organic solvents constitute only a very minor proportion of the total liquid medium.

In view of the excellent properties of solvent-based epoxy coating compositions for various coating applications, those in the coatings art have been extremely interested in developing aqueous coating compositions derived from epoxy resins. Prior attempts to develop such compositions involved reacting hydroxy carboxylic acids and epoxy compounds. However, in reacting such compounds, two types of reaction may result due to the chemical nature of the materials used. The hydroxyl groups of the hydroxy acid may react with the epoxide groups to form ether linkages, or the carboxyl group or groups of the acid may react with the epoxide to form ester groups. Both reactions may occur in an uncontrolled reaction to yield products having mixed ether or ester linkages to a non-predetermined degree. Such reaction with the epoxides and acids previously employed have not been tolerable since the ultimate products have not generally been suitable for any practical purpose.

Early efforts to solve these problems involved attempts to optimize the etherification portion of the reaction while minimizing the esterification portion of the reaction. (See, e.g., U.S. Pat. Nos. 3,404,018 and 3,410,773). In addition, attempts were made to utilize products containing both ester and ether linkages. (See, e.g., U.S. Pat. Nos. 3,707,526 and 3,792,112). However, these efforts were not particularly successful since compositions produced from these techniques exhibited significant disadvantages including poor cured film saponification resistance, low hydrolysis resistance, and lack of adequate package stability.

It has recently been proposed, as disclosed in U.S. Pat. No. 3,960,795, to prepare aqueous-based epoxy resins by a process which involves reacting an epoxy-containing organic material with a compound containing at least one phenolic hydroxyl group and a group hydrolyzable to a carboxyl group following which the resultant composition is hydrolyzed to generate carboxyl groups and then solubilized in known manner by neutralizing at least a portion of the carboxyl groups with a basic compound such as an alkali metal hydroxide or amine. In addition, it has also been proposed, as described in copending application Ser. No. 680,935, filed Apr. 28, 1976, commonly assigned to Applicant's assignee herein, to produce aqueous-based epoxy resins by a process which involves reacting an epoxy-containing organic material with a compound containing a mercaptan group and at least one group hydrolyzable to a carboxyl group, following which the resultant composition is hydrolyzed to generate carboxyl groups and then solubilized by neutralizing a portion of the carboxyl groups with a basic compound.

While the processes and products disclosed in the aforementioned patent and application are advantageous in many respects, they also exhibit significant disadvantages. Thus, for example, the processes described in the aforementioned patent and copending applications ordinarily require saponification, neutralization and filtration steps prior to neutralization with the base and solubilization in water. As will be evident, such processes, in view of the number of processing steps and procedures, can be time consuming and costly.

SUMMARY OF THE INVENTION

In accordance with this invention, water-reducible epoxy resins are prepared by a method which obviates substantially all of the above disadvantages. Thus, water-reducible epoxy resins are prepared by reacting a polyglycidyl ether of a polyphenol with an amino acid containing at least one amine group and one carboxyl group, wherein the amine group of the acid is preferentially reactive with the epoxy groups of the polyglycidyl ether. The resultant product can then be solubilized (i.e., rendered water-reducible) by neutralizing at least a portion of the acid functionality therein with an amine or other base. Especially valuable amino acids are the aromatic amino acids such as anthranilic acid, p-aminobenzoic acid, m-aminobenzic acid, and 3-amino-p-toluic acid.

When used in electrodeposition, the compositions herein deposit on the anode. The resultant appropriately crosslinked films, as well as those applied by conventional coating techniques, are characterized by increased cured film saponification resistance, improved hydrolytic stability, improved salt spray resistance and good hardness. Additionally, these compositions have excellent package stability. Since the reaction products contain hydroxyl functionality, a wide variety of conventional crosslinking agents can be employed in formulations with these new resins.

Further, highly useful products can be obtained when the reaction products of the present invention are blended with reactive or non-reactive resins such as water-soluble acrylics, acrylic interpolymer dispersions, acrylic polymer emulsions, aminoplast resins, phenolic resins, polyester resins, blocked or semi-blocked polyisocyanates and the like.

Highly-useful water-based products can be obtained from the reaction products and the above-mentioned resin products which are suitable for use as water-based coating compositions for a variety of protective and decorative coating applications. In a particular embodiment, a water-based coating composition which is suitable for use as an internal sanitary liner for metal beverage containers is formulated by blending the reaction product with an aminoplast resin.

DESCRIPTION OF THE INVENTION

The compositions of the present invention are prepared by reacting a polyglycidyl ether of a polyphenol with an amino acid containing at least one amine group and one carboxyl group, wherein the amine group of the amino acid is preferentially reactive with the epoxy groups of the polyglycidyl ether.

A preferred class of polyglycidyl ethers which may be employed in preparing the compositions of the invention are the polyglycidyl ethers of polyphenols, such as bisphenol A or bisphenol F. These may be produced, for example, by etherification of a polyphenol with epichlorohydrin or dichlorohydrin in the presence of an alkali. The phenolic compound may be 1,1-bis(4-hydroxyphenyl)ethane, 1,1-bis(4-hydroxyphenyl)isobutane, 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane, or the like. Another quite useful class of polyglycidyl ethers are produced similarly from Novolak resins or similar polyphenol resins.

Amino acids which may be employed in preparing the compositions herein are amino acids which contain at least one amine group and one carboxyl group in which the amine group of the amino acid is preferentially reactive with the epoxy groups of the polyglycidyl ether.

It was surprising and unexpected to find in this invention that certain amino acids contain amine groups which are preferentially or selectively reactive with epoxy groups and that such amino acids can be directly reacted with epoxy resins to form reaction products containing free carboxyl groups available for solubilization purposes without first blocking the carboxyl groups of the amino acid as by reaction with an alcohol (i.e., ester formation) or strong base (e.g., NaOH). This was particularly unexpected since previous attempts to prepare such water-reducible products utilizing simple (i.e., short chain) aliphatic amino acids indicated that the epoxy groups of the epoxy resin reacted principally with the carboxyl groups of the amino acid, thereby resulting in a product containing little if any free carboxyl functionality available for solubilization purposes.

The preferred amino acids for use in preparing the compositions of the invention are aromatic amino acids in which the amine group and carboxyl group are both attached to the aromatic ring. Especially preferred amino acids of this type are the aminobenzoic acids, including anthranilic acid, p-aminobenzoic acid and m-aminobenzoic acid, and other aromatic amino acids such as 3-amino-p-toluic acid. Other amino acids useful in many instances include 3-aminosalicylic acid, 3-amino-4-methoxybenzoic acid, 6-amino-m-toluic acid, 3-amino-4-chloro-benzoic acid, 2-amino-5-nitrobenzoic acid, 2-nitro-5-aminobenzoic acid. In some cases it may be necessary to use a specific solvent chosen to dissolve certain difficult-to-dissolve amino acids, one example being 5-aminoisophthalic acid which otherwise does not react.

In reacting the polyglycidyl ether with the amino acid, in general, the equivalent ratio of epoxy groups contained in the polyepoxide to amino groups contained in the amino acid should be between about 1.0 to 0.20 and 1.0 to 1.25, and preferably 1.0 to 0.5 and 1.0 to 1.0. It is generally preferred that the carboxyl content of the reaction product be at least equivalent, when in an unneutralized state, to an acid value of at least about 15 at 100 percent solids.

In reacting the polyglycidyl ether of the polyphenol and the amino acid, a catalyst may be used, if desired. Suitable catalysts include acid catalysts such as p-toluenesulfonic acid, butylphosphoric acid, methane sulfonic acid, and the like. In general, where catalysts are employed, they should be used in amounts from about 0.01 to about 3.0 percent by weight based on total weight of the epoxy-containing material and aromatic amino acid. Usually, it is desirable to react the components at moderately elevated temperatures, and for this purpose, temperatures of from about 200° F. to about 350° F. are generally acceptable. Of course, it is to be recognized that the reaction temperature can be varied between the lowest temperature at which the reaction reasonably proceeds and the temperatures indicated above.

It is not absolutely necessary to employ a solvent in the preparation of the reaction product, for example, when the reactants are mutually soluble and of suitable viscosity but one is usually used in order to provide for more efficient processing. The organic solvent used should be a nonepoxy-reactive solvent and, since the finished product is intended to be water-reducible, it is preferred to employ water-miscible or at least partially water-miscible organic solvents. Preferred solvents of this type include the monoalkyl ethers of ethylene glycol, propylene glycol and dipropylene glycol such as, for example, ethylene glycol monoethyl ether, ethylene glycol monobutyl ether, propylene glycol monomethyl ether, dipropylene glycol monomethyl ether and the like. Mixtures of these ether type alcohols and lower alkanols such as ethanol, propanol and isopropyl alcohol may also be employed. Additionally, in some instances, minor proportions of hydrocarbon solvents such as toluene and xylene may be utilized in combination with the preferred solvents.

The reaction products can then be solubilized (i.e., rendered water-reducible) by neutralizing at least a portion of the carboxyl groups thereof with an amine or other base. As will be apparent, the term "solubilized" as employed herein refers to the neutralization or partial neutralization of the acid groups of the reaction product to form the salt or partial salt of the product to thereby render it water-reducible or water-thinnable.

Volatile bases are preferred, particularly when the composition is to be applied by spraying, roll coating, dipping or the like (by "volatile bases" is meant bases which evaporate at temperatures at or below that at which the material is cured). Non-volatile bases, such as alkali metal hydroxides, may be used when application by electrodeposition or other methods which remove the solubilizing agent are to be used. Amines are the preferred volatile neutralizing agents, although others, such as quaternary ammonium hydroxides, can be used.

In general, the amines which may be employed herein for neutralization purpose include any of the amines used for solubilizing resin systems known heretofore including ammonia; alkylamines such as ethylamine, propylamine, dimethylamine, dibutylamine, triethylamine, cyclohexylamine and the like; allylamine; alkanolamines such as monoethanolamine; dimethylethanolamine, diethylethanolamine, 2-amino-2-methyl-1-propanol, 2-dimethylamino-2-methyl-1-propanol and the like; aralkylamines such as benzylamine and the like; cyclic amines such as morpholine, piperidine and the like, and diamines such as ethylene diamine and the like. The preferred amines for use herein are dimethylethanolamine and diethylethanolamine. Mixtures of such solubilizing agents may also be used. If desired, moderately elevated temperatures may be employed in solubilizing the product. Essentially any amount of solubilizing agent may be utilized as long as the desired degree of water-solubility or water-dispersibility is obtained. In general, the amount of solubilizing agent will be dependent upon the acid value of the reaction product. It is usually preferred to react one equivalent of solubilizing agent per equivalent acid group, although higher and lower amounts may be used. In general, it is preferred to utilize the minimum amount of solubilizing agent to obtain the solubilized product.

As indicated heretofore, this invention is principally concerned with aqueous compositions which are formulated from the above described reaction products. However, in certain cases, solvent-based coating compositions containing these reaction products may be valuable for certain applications and such compositions are considered to be within the scope of this invention. When it is desired to prepare solvent-based compositions utilizing these reaction products, this can readily be accomplished by dissolving or dispersing the reaction products in conventional organic solvents which are well known to those in the coatings art. Thus, organic solvents such as the hydrocarbons, alkanols, esters, ethers, and ketones may be employed for that purpose. As noted above, it is often desirable to prepare coating compositions from the reaction products herein in which the liquid medium is a mixture of water and organic solvents. This can be conveniently accomplished, as indicated above, by utilizing a water-miscible or partially water-miscible organic solvent to first prepare the reaction product in organic solvent solution and then after solubilization with the amine, water can be added to the solution or the reaction product solution can be dissolved or dispersed in water.

While the product hereinabove described may be used as the sole resinous component of the coating composition, it is frequently desirable in order to improve or modify film appearance and/or film properties, to incorporate into the composition various non-reactive and reactive compounds or resinous materials, including phenolic resins such as allyl ether-containing phenolic resins; triazine resins such as melamine-based resins and benzoguanamine-based resins, especially alkylated formaldehyde reaction products thereof; urea-formaldehyde resins; hydrocarbon resins, such as polybutadiene, maleic anhydride adducts of polybutadiene, styrene-butadiene latices, etc.; water-soluble acrylic resins, such as those in U.S. Pat. No. 3,403,088; acrylic polymer emulsions; aqueous dispersions of amide-containing acrylic interpolymers; blocked or semi-blocked polyisocyanates; or combinations thereof. The reaction products herein may also be blended with polyesters, polyamides, and the like. When using such modifying materials, such materials generally comprise from 95 to 5 percent by weight, and preferably from 50 to 5 percent by weight, based on total resinous solids, with the balance being the reaction products disclosed herein.

It is generally preferred that the reaction products described herein be combined with a suitable curing or crosslinking agent. Such materials, as noted above, include aminoplast resins, phenolic resins and blocked or semi-blocked polyisocyanates.

The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzylurea, dicyandiamide, formoguanamine, acetoguanamine, ammeline, 2-chloro-4,6-diamino-1,3,5-triazine, 6-methyl-2,4-diamino-1,3,5-triazine, 3,5-diamino triazole, triaminopyrimidine, 2-mercapto-4,6-diaminopyridine, and the like.

While the aldehyde employed is most often formaldehyde, other similar condensation products can be made from other aldehydes or mixtures thereof, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols, as methanol, ethanol, propanol, butanol, pentanol, hexanol, heptanol and monoethers of glycols. The preferred aminoplast resins are substantially etherified with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Aldehyde-releasing agents such as paraformaldehyde and hexamethylenetetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in the ortho, meta, or para position, and where the double bond occurs in various positions in the hydrocarbon chain. A common phenolic resin is phenol formaldehyde resin.

Any blocked or semi-blocked organic polyisocyanate may be used as the curing agent herein. The organic polyisocyanates are blocked with a volatile alcohol, ε-caprolactam, ketoximes, or the like, and will unblock at elevated temperatures. These curing agents are well-known in the art.

The amounts of curing or crosslinking agents employed in combination with the reaction products herein can vary widely depending on desired properties. In general, from about 5 to about 95 percent by weight, preferably from 5 to 50 percent by weight of the crosslinking agents based upon the combined total solids weight of the crosslinking agent and reaction product may be utilized.

As noted above, various other resinous materials other than the aforementioned curing or crosslinking agents may be blended with the reaction products herein to provide useful products. Particularly advantageous products may be prepared by blending the reaction products herein with acrylic polymer emulsions and aqueous amide-containing acrylic interpolymer dispersions described hereinafter.

Suitable acrylic polymer emulsions which may be employed in conjunction with these reaction products are copolymerized latex products which are prepared by conventional emulsion polymerization in aqueous medium of various vinyl and equivalently-reactive unsaturated monomers in the presence of conventional emulsion polymerization catalysts and surface-active water-soluble anionic or non-ionic dispersing agents.

Various vinyl and equivalently-reactive unsaturated monomers may be utilized such as, for example, alkyl acrylates having from 4 to 15 carbon atoms, alkyl methacrylates having from 5 to 15 carbon atoms, unsaturated carboxylic acids particularly acrylic acid and methacrylic acid and other monomers containing a $CH_2=C<$ group in the terminal position such as, for example, the vinyl aromatic hydrocarbons, unsaturated organonitriles and the like.

The acrylic polymer emulsions are prepared by conventional emulsion polymerization of these vinyl or equivalently reactive monomers in the presence of conventional emulsion polymerization catalysts and surface-active water-soluble anionic or non-ionic dispersing agents. Various conventional emulsion polymerization catalysts may be employed including among others the conventional peroxides such as benzoyl peroxide, cumene peroxide, tertiary-butyl perbenzoate, etc. and the persulfates such as ammonium, sodium and potassium persulfates. Various anionic and non-ionic dispersing agents may be employed including among others the alkyl phenoxy polyethoxyethanols, sulfur containing agents such as those obtained by condensing ethylene oxide with mercaptans and alkyl thiophenols, and the like. In addition, conventional coinitiators and buffers may be utilized in preparing the high molecular weight acrylic polymer emulsions.

Aqueous acrylic interpolymer dispersions which may preferably be blended with the reaction products herein are aqueous dispersions of amide-containing acrylic interpolymers such as those described in U.S. Pat. No. 3,991,216. As described in the aforementioned patent the interpolymers of these aqueous dispersions are formed from substituted carboxylic acid amides, ethylenically unsaturated carboxylic acids and certain ethylenically unsaturated hardening and flexibilizing monomers. Aqueous dispersions of these interpolymers are prepared by neutralizing or partially neutralizing the acid groups of the interpolymer with an amine or other base.

As set forth in the patent, the preferred materials employed in forming these interpolymrs are N-alkoxyalkyl-substituted amides such as N-(butoxymethyl) acrylamide, N-(butoxymethyl) methacrylamide and the like; ethylenically unsaturated carboxylic acids such as acrylic and methacrylic acid; unsaturated hardening monomers such as styrene, vinyl toluene or alkyl methacrylates having 1 to 4 carbon atoms and unsaturated flexibilizing monomers such as alkyl acrylates having up to 13 carbon atoms and alkyl methacrylates having from 5 to 16 carbon atoms.

For a detailed description of these aqueous acrylic interpolymer dispersions and their method of preparation, reference can be made to the aforementioned U.S. Pat. No. 3,991,216 incorporated herein by reference.

In addition to the components above, the compositions may, if desired, contain other optional ingredients, including any of the pigments ordinarily used in coating compositions of this general class. In addition, various fillers, antioxidants, flow control agents, surfactants, and other such formulating additives may be employed.

The compositions herein can be applied by essentially any coating method, including brushing, spraying, dipping, roll coating, flow coating and electrodeposition. When used in electrodeposition, the compositions deposit on the anode. The compositions may be applied over virtually any substrate, including wood, metals, glass, cloth, plastics, foams, and the like, as well as over various primers, to provide protective and decorative coatings. They can be used, for example, to coat metal containers as described in copending application Ser. No. 775,489, filed on even date herewith.

The invention will be further described in connection with the several examples which follow. These examples are given as illustrative of the invention and are not to be construed as limiting it to their details. All parts and percentages in the examples and throughout the specification are by weight unless otherwise indicated.

EXAMPLE 1

To a reactor equipped with a heating means, stirrer, thermometer, reflux condenser and means for providing an inert gas blanket were charged 1482.0 grams of Epon 829 (a liquid polyglycidyl ether of Bisphenol A having an epoxide equivalent of about 198, containing an epoxy condensation catalyst, available from Shell Chemical Company) and 616.0 grams of Bisphenol A. The reaction mixture was heated to 280° F. and the heat removed to allow for an exotherm. The maximum temperature reached during exotherm was 390° F. During this period, cooling was applied and the mixture was held above 350° F. for 1 hour. The epoxy equivalent of the polyepoxide produced was 1,015. After the hold period, 600.0 grams of ethylene glycol monoethyl ether (hereinafter ethyl Cellosolve) were added to the reactor. During this addition, the temperature decreased to 250° F. Heating was then resumed and 5.0 grams of Cyzac 4040 (a 40 percent solution of p-toluene-sulfonic acid in isopropyl alcohol available from American Cyanamid Company) and 302.0 grams of p-aminobenzoic acid were added to the reactor. The reaction mixture was then held for 3 hours at a temperature of about 290° F. Following this hold period, 692.0 grams of propylene glycol isobutyl ether were added.

The resultant reaction product had a non-volatile solids content of 64.9 percent, a Gardner-Holdt viscosity of Z10 and an acid value of 33.4 (51.4 at 100 percent solids).

To a 65.5 gram sample of the above reaction product were added 3.5 grams of dimethylethanolamine and 90.2 grams of deionized water with stirring. The resultant composition had a non-volatile solids content of about 26.7 percent and a pH of 8.3.

EXAMPLE 2

To a reactor equipped as in Example 1 were charged 1493.0 grams of Epon 829 and 706.0 grams of Bisphenol A. The reaction mixture was heated to 280° F. and the heat removed to allow for an exotherm (maximum temperature 400° F.). During this period, cooling was applied and the mixture was held above 350° F. for 1 hour. The polyepoxide produced had an epoxy equivalent of 1,554. After this hold period, 600.0 grams of ethyl Cellosolve were added to the reactor. During this addition, the temperature decreased to 260° F. Heating was resumed and then 5.0 grams of Cyzac 4040 and 201.0 gramsof p-aminobenzoic acid were added. The reaction mixture was then held for 3 hours at 280° F.-290° F. After this hold period, 692.0 grams of propylene glycol isobutyl ether were added.

The resultant reaction product had a non-volatile solids content of 64.3 percent and an acid value of 22.0 (34.2 at 100 percent solids).

To a 65.5 gram sample of the above reaction product were added 2.3 grams of dimethylethanolamine and 91.4 grams of deionized water with stirring. The resultant composition had a non-volatile solids content of 25.3 and a pH of 8.5.

EXAMPLE 3

To a reactor equipped as in Example 1 were charged 1,497.0 grams of Epon 829 and 753.0 grams of Bisphenol A. The mixture was heated to 280° F. following which the heat was removed to allow for an exotherm which reached a maximum temperature of 407° F. The reaction mixture was held above 350° F. for 1 hour and then cooled to 300° F. The polyepoxide produced had an epoxy equivalent of 1,869. At this point, 600.0 grams of ethylene glycol monobutyl ether (hereinafter butyl Cellosolve) were added to the reactor and the temperature decreased to 260° F. Heating was again resumed and when the temperature reached about 280° F., 5.0 grams of Cyzac 4040 and 150.0 grams of p-aminobenzoic acid were added to the reactor. The reaction mixture was then held for 3 hours at temperature. After the hold period (temperature 280° F.), 692.0 grams of propylene glycol isobutyl ether were added.

The resultant reaction product had a non-volatile solids content of 64.3 percent and an acid value of 16.2 (25.2 at 100 percent solids).

To a 65.5 gram sample of the above reaction product were added 1.7 grams of dimethylethanolamine and 92.0 grams of deionized water with stirring. The resultant composition had a non-volatile solids content of 26.4 percent and a pH of 9.0.

EXAMPLE 4

To a reactor equipped as in Example 1 were charged 750.0 grams of Epon 829 and 375.0 grams of Bisphenol A. The mixture was heated to 300° F. following which the heat was removed and the mixture allowed to exotherm reaching a maximum temperature of 420° F. The reaction mixture was held above 350° F. for 1 hour and then cooled to 300° F. At this point, 75.0 grams of anthranilic acid were added and the reaction mixture then held for 2 hours at 310°–320° F. The reaction mixture was then cooled and 600.0 grams of butyl Cellosolve was added to the reactor. The resultant reaction product had a non-volatile solids content of 66.2 percent and an acid value of 19.7 (29.8 at 100 percent solids).

To a 100.0 gram sample of the above reaction product (temperature at 160° F.) was added 2.1 grams of dimethylethanolamine with stirring, following which 114.0 grams of deionized water was added. The resultant composition had a non-volatile solids content of about 33.0 percent and a pH of 9.1.

EXAMPLE 5

To a reactor equipped as in Example 1 were charged 1656.0 grams of Epon 829 and 481.0 grams of Bisphenol A. The mixture was heated to 280° F. and the heat then removed to allow for exotherm (maximum 360° F.). The reaction mixture was then held for 1 hour above 350° F. The product was a polyepoxide having an epoxide equivalent of 522. After the hold period, 600.0 grams of butyl Cellosolve were added to the reaction mixture. After this addition was complete, 10.0 grams of Cyzac 4040 and 263.0 grams of p-aminobenzic acid were added to the reaction mixture with the temperature at 300° F. The reaction mixture was then held for 3 hours at about 300° F. Following this period, 428.0 grams of butyl Cellosolve were added to the reactor.

The resultant reaction product had a non-volatile solids content of about 70.0 percent and an acid value of 24.8 (35.5 at 100 percent solids).

To a 55.5 gram sample of the above reaction product were added 11.2 grams of butyl Cellosolve, 2.2 grams of dimethylethanolamine and 91.1 grams of deionized water. The resultant composition had a non-volatile solids content of 28.9 percent, a Gardner-Holdt viscosity of Z9− and a pH of 8.25.

EXAMPLE 6

To a reactor equipped as in Example 1 were charged 1510.0 grams of Epon 829 and 627.0 grams of Bisphenol A. The reaction mixture was heated to 280° F. and the heat was then removed to allow for exotherm (maximum temperature 440° F.). The reaction mixture was then held at above 350° F. for 1 hour. The polyepoxide produced had an epoxy equivalent of 858. Following the hold period, the reaction mixture was cooled to about 380° F. and 600.0 grams of butyl Cellosolve were added. Then, 10.0 grams of Cyzac 4040 and 263.0 grams of p-aminobenzic acid were added to the reaction mixture (temperature about 260° F.). The reaction mixture was then heated to 300° F. and held for 3 hours at this temperature. Following this hold period, 428.0 grams of butyl Cellosolve were added to the reactor.

The resultant reaction product had a non-volatile solids content of about 70.0 percent and an acid value of 30.2 (43.1 at 100 percent solids).

To a 57.1 gram sample of the above reaction product were added 9.6 grams of butyl Cellosolve, 2.7 grams of dimethylethanolamine and 90.6 grams of deionized water. The resultant composition had a non-volatile solids content of 27.8 percent, a Gardner-Holdt viscosity of W− and a pH of 8.35.

EXAMPLE 7

To a reactor equipped as in Example 1 were charged 1,656.0 grams of Epon 829 and 481.0 grams of Bisphenol A. The reaction mixture was heated to 280° F. and the heat then removed to allow for exotherm (maximum temperature 380° F.). The reaction mixture was then held for 1 hour above 350° F. The polyepoxide produced had an epoxy equivalent of 500. After this hold period, 600.0 grams of butyl Cellosolve were added to the reaction mixture and the temperature decreased to about 270° F. After the temperature of the reaction mixture again reached 300° F., 10.0 grams of Cyzac 4040 and 263.0 grams of p-aminobenzoic acid were added. The reaction mixture was then held for 1 hour at this temperature. Following this addition, the contents of the reactor were cooled to about 280° F. and then 428.0 grams of butyl Cellosole were added.

The resultant reaction product had a non-volatile solids content of about 70.0 percent and an acid value of 28.9 (41.3 at 100 percent solids).

To a 55.5 gram sample of the above reaction product were added 11.2 grams of butyl Cellosolve, 2.7 grams of dimethylethanolamine, and 91.0 grams of deionized water. The resultant composition had a non-volatile solids content of 27.3 percent, a Gardner-Holdt viscosity of Z6 and a pH of 8.75.

EXAMPLES 8–11

To a reactor equipped as in Example 1 were charged 3,750.0 grams of Epon 829 and 1,875.0 grams of Bisphenol A. The reaction mixture was heated to 300° F. and the heat was then removed to allow for exotherm, (maximum temperature attained was 404° F.). The reaction mixture was then held for 1 hour above 350° F. The polyepoxide had an epoxy equivalent of 1,616. After this hold period, 1,500.0 grams of butyl Cellosolve were added to the reaction mixture at which time the temperature decreased to about 290° F. After the temperature again reached 300° F., 25.0 grams of Cyzac 4040 and 375.0 grams of p-aminobenzoic acid were added. Following this addition, the reaction mixture was held at about 300° F. for 3 hours. Following this period, 1,730.0 grams of butyl Cellosolve were added to the reactor.

The resultant reaction product had a non-volatile solids content of 64.3 percent, a Gardner-Holdt viscosity of Z10+ and an acid value of 15.7 (24.4 at 100 percent solids).

The above reaction product was neutralized with various basic compounds by admixing the following ingredients:

| Ingredients | Parts by Weight (Grams) | | | |
|---|---|---|---|---|
| | Ex. No. 8 | 9 | 10 | 11 |
| Reaction product above | 61.5 | 61.5 | 61.5 | 61.5 |
| butyl Cellosolve | 5.2 | 5.2 | 5.2 | 5.2 |
| dimethylethanolamine | 1.5 | — | — | — |
| triethylamine | — | 1.8 | — | — |
| NH4OH (28 percent solution in H2O) | — | — | 2.5 | — |
| 2-amino-2-methyl-1-propanol | — | — | — | 1.5 |
| deionized water | 91.8 | 91.5 | 90.8 | 91.8 |

The resultant compositions had the following properties:

| | 8 | 9 | 10 | 11 |
|---|---|---|---|---|
| Non-volatile solids content (%) | 27.3 | 27.7 | 26.7 | 27.2 |
| Gardner-Holdt viscosity | K-L | D-E | W+ | Z4 |
| pH | 8.6 | 9.0 | 8.7 | 8.5 |
| Appearance | Clear solution | Translucent solution | Clear solution | Clear solution |

EXAMPLES 12-14

To a reactor equipped as in Example 1 were charged 750.0 grams of Epon 829 and 375.0 grams of Bisphenol A. The reaction mixture was heated to 300° F. and the heat was then removed to allow for an exotherm (maximum temperature reached was 400° F.). The mixture was then held above 350° F. for 1 hour. The polyepoxide produced had an epoxy equivalent of 1,800. Following this hold period, 300.0 grams of butyl Cellosolve were added to the reaction mixture with cooling until the temperature reached 300° F. (about 1 hour). Then, 5.0 grams of Cyzac 4040 and 75.0 grams of p-aminobenzoic acid were added to the reactor. The reaction mixture was then held at 300° F. for about 4 hours. After this hold period, 300.0 grams of butyl Cellosolve were added.

The resultant reaction product had a non-volatile solids content of 67.2 percent and an acid value of 15.3 (22.8 at 100 percent solids).

This reaction product was neutralized by admixing the following ingredients:

| Ingredients | Parts by Weight (Grams) | | |
|---|---|---|---|
| | Ex. No. 12 | 13 | 14 |
| Reaction product above | 100.0 | 100.0 | 100.0 |
| butyl Cellosolve | 11.8 | 11.8 | — |
| dimethylethanolamine | 2.4 | 3.0 | 3.0 |
| deionized water | 109.4 | 154.4 | 157.0 |

The resultant compositions had the following properties:

| | 12 | 13 | 14 |
|---|---|---|---|
| Non-volatile solids content (%) | 29.8 | 26.3 | 26.2 |
| pH | 8.1 | 8.7 | 8.9 |
| Comments | Composition settled* after aging overnight | Clear solution stable after aging overnight | Clear solution stable after aging overnight |

(*due to slightly low level of neutralization)

EXAMPLE 15

To a reactor equipped as in Example A were charged 750.0 grams of Epon 829 and 375.0 grams of Bisphenol A. The reaction mixture was heated to 300° F. and the heat was then removed to allow for an exotherm (maximum temperature 400° F.). The mixture was then held above 350° F. for 1 hour. The resultant polyepoxide had an epoxy equivalent of 1,800. Following this hold period, 300.0 grams of butyl Cellosolve were added to the reaction mixture with cooling until the temperature reached 300° F. (about 1 hour). Then, 5.0 grams of Cyzac 4040 and 75.0 grams of p-aminobenzoic acid were added to the reactor. The reaction mixture was then held at 300° F. about 4 hours. After this period, 300.0 grams of butyl Cellosolve were added.

The resultant reaction product had a non-volatile solids content of 67.2 percent and an acid value of 15.3 (22.8 at 100 percent solids).

A sample of the above reaction product was solubilized in the following manner:

To a reactor equipped with heating means, stirrer, thermometer, and dropping funnel was charged 1,000.0 grams of the reaction product. The reaction product was heated to 145° F. and then 118.0 grams of butyl Cellosolve were added to the reactor with stirring. After about 20 minutes of stirring, 29.0 grams of dimethylethanolamine were added. After about 30 minutes of stirring, 125.3 grams of deionized water were added dropwise over a 1 hour period. The contents of the reactor were then held for 2 hours at 140°-150° F. Following this period, 150.0 grams of deionized water were added to the reactor.

The resultant composition had the following properties:

| | |
|---|---|
| Non-volatile solids content | 26.2 percent |
| Gardner-Holdt viscosity | Y |
| Acid Value | 6.5 (22.8 at 100 percent solids) |
| pH | 8.6 |
| Composition of Liquid Medium (% by weight) | |
| Deionized water | 74.7 |
| butyl Cellosolve | 23.8 |
| dimethylethanolamine | 1.5 |

The following examples illustrate various utilizations of the reaction products herein.

EXAMPLE 16

A coating composition was prepared by blending the following:

|  | Parts by Weight |
| --- | --- |
| Product of Example 1 | 159.20 |
| Cymel 303* | 7.50 |

*A highly methylated melamine resin having a non-volatile percentage of 98 minimum, a Gardner-Holdt viscosity at 25° C. of X-Z2, a Gardner color of 2 maximum, and a methylol content of about 1.5 percent, available from American Cyanamid Company.

The composition was then drawn down on Bonderite 1000 pretreated steel panels (3 mil wet film thickness) and baked at 325° F. for 20 minutes). The resultant film exhibited excellent properties having a pencil hardness of 4H; a direct impact strength in excess of 160 inch-pounds; a reverse impact strength of 140 inch-pounds and passed 100 acetone double rubs.

EXAMPLE 17

A coating composition was prepared by blending the following:

|  | Parts by Weight |
| --- | --- |
| Product of Example 2 | 159.20 |
| Cymel 303 | 7.50 |

The composition was drawn down and baked as in Example 16. The resultant film had a pencil hardness of 3H, a direct and reverse impact strength in excess of 160 inch-pounds, and passed 50 acetone double rubs.

EXAMPLE 18

A coating composition was prepared by blending the following:

|  | Parts by Weight |
| --- | --- |
| Product of Example 3 | 159.20 |
| Cymel 303 | 7.50 |

The composition was drawn down and baked as in Example 16. The resultant film had a pencil hardness of 3H, a direct and reverse impact strength in excess of 160 inch-pounds and passed 25 acetone double rubs.

EXAMPLE 19

A pigment paste was prepared by grinding the following ingredients to a number 7.5 Hegman in a steel ball rolling mill:

|  | Parts by Weight |
| --- | --- |
| Resin vehicle* | 78.0 |
| Barytes | 79.1 |
| Red iron oxide | 15.8 |
| Bentone 34 talc | 2.1 |
| Blanc fixe | 1.1 |
| Fumed litharge | 1.1 |
| Carbon black | 0.8 |
| Witco 912 surfactant | 2.0 |
| Deionized water | 20.0 |

*A 30 percent solids epoxy-fatty acid ester prepared by reacting a mixture consisting of 64.3 percent Epon 828, a condensation product of epichlorohydrin and Bisphenol A having an epoxide equivalent of about 185-192, commercially available from Shell Chemical Co.; 20.1 percent of Pamolyn 200, a fatty acid composition containing 17 percent by weight oleic acid, 70 percent by weight linoleic acid and 11 percent by weight conjugated linoleic acid, which is commercially available from Hercules, Inc.; and 15.6 percent maleic anhydride.

The pigment paste contains 62.5 percent total solids of which 80 percent is pigment and 20 percent is resinous vehicle.

A coating composition for use as a metal primer was prepared by blending the following ingredients:

|  | Parts by Weight |
| --- | --- |
| Product of Example 15 | 120.8 |
| Acrylic polymer latex[1] | 97.2 |
| Beetle 80[2] | 7.8 |
| Pigment paste (above) | 39.0 |
| Deionized water | 15.2 |

[1]An acrylic polymer emulsion having a total solids content of 38.9 percent by weight and a viscosity of 30 centipoises, prepared by emulsion polymerization of a monomer mixture consisting of 51.0 percent ethyl acrylate, 40.0 percent styrene, 5.0 percent hydroxypropyl acrylate and 4.0 percent acrylic acid in accordance with the procedure described in the specification above.
[2]A butylated urea formaldehyde resin having a solids content of about 96 percent, a Gardner-Holdt viscosity of X-Z3 and a methylol content of less than one percent, commercially available from American Cyanamid Company.

The primer coating composition was then spray applied to both untreated steel and Bonderite 40 pretreated steel panels. When baked at 325° F. for 30 minutes a film of 1.5 mil thickness was produced. The coated panels were then topcoated with a commercial acrylic enamel coating and evaluated for impact resistance and salt spray resistance utilizing standard impact resistance and salt spray resistance tests. The primer coating on the untreated steel panel exhibited good impact resistance, passing up to 80 inch-pounds while the primer coating on the treated panel had excellent impact resistance, passing over 80 inch-pounds. The primer coating on the untreated steel panels exhibited good salt spray resistance, showing a scribe creepage of 3/16 inch after 11 days exposure to a 5 percent aqueous salt spray at 100° F. while the treated panel showed excellent salt spray resistance, exhibiting virtually no scribe creepage under the same exposure conditions.

EXAMPLE 20

A primer coating composition was prepared by blending the following ingredients:

|  | Parts by Weight |
| --- | --- |
| Reaction product of Example 15 | 120.8 |
| Acrylic polymer latex* | 97.2 |
| Beetle 80 | 7.8 |
| Pigment paste of Example 19 | 39.0 |

*An acrylic polymer emulsion having a total solids content of 38.9 percent by weight and a viscosity of 45 centipoises prepared by emulsion polymerization of a monomer mixture consisting of 51.0 percent butyl acrylate, 40.0 percent styrene, 5.0 percent hydroxypropyl acrylate and 4.0 percent acrylic acid, in accordance with the procedure described in the specification above.

The primer coating composition was spray applied to untreated and treated steel panels, baked, topcoated and evaluated for impact resistance as in Example 19.

The primer coating on both the untreated and treated steel panels exhibited excellent impact resistance, passing in excess of 80 inch-pounds and excellent salt spray resistance, showing a scribe creepage of less than ⅛ inch after 11 days exposure to the salt spray.

EXAMPLE 21

A water-based coating composition for use as an internal sanitary liner for a metal beverage container was prepared by blending the following ingredients:

| Ingredients | Parts by Weight (Grams) |
| --- | --- |
| Reaction product used in Examples 8-11 (unneutralized) | 1600.00 |
| Cymel 370* | 61.50 |
| Triethylamine | 54.50 |
| Deionized water | 2300.00 |
| Butyl Cellosolve | 145.00 |

*A partially methylated melamine resin having a non-volatile percentage of 88 ± 2, a Gardner-Holdt viscosity at 25° C. of Z2 - Z4, a Gardner color of 1 maximum, and a methylol content of 12 percent, available from American Cyanamid Company.

The resultant water-based coating composition had a non-volatile solids content of 26.0 percent by weight and a No. 4 Ford Cup viscosity of 20.8 seconds. The liquid medium of the composition consisting of 76.1 percent by weight of water and 23.9 percent by weight of organic solvents.

The composition was sprayed into two-piece aluminum cans utilizing a conventional airless gun. The coated cans were cured using a two cycle bake; the first cycle involving baking for 2.5 minutes at 270° F. and the second cycle involving baking for 2.5 minutes at 400° F.

A visual examination of the cans indicated good coating coverage and appearance. The film integrity of each can was evaluated using a standard beverage container coating test referred to in the coating field as an enamel rater quick test. This is a test in which a 1 percent sodium chloride salt solution is placed inside the coated can and a circuit is produced by placing an electrode in the salt solution and a connection on the outside surface of the can. A flow of electrical current will result if there are any bare spots on the coated interior of the can. The current, if present, is measured with an ammeter in milliamps.

In this test, cans were obtained having film weights of 220 milligrams and 240 milligrams respectively and these produced readings of 19 and 8.5 milliamps respectively. These readings indicate good film integrity.

Other tests run on the coated cans were buffer resistance and beer pasteurization resistance. In the buffer resistance test, a coated sample is placed in a borax buffer solution having a pH of 9.20 and a concentration of 3.8 grams of $Na_2B_4O_7 \cdot 10H_2O$ per liter of water for 30 minutes at 160° F. and the coating is then checked for blushing, blistering and adhesion failure. The beer pasteurization resistance test is performed and evaluated in the same manner except that the coated sample is placed in beer. In these tests, the cured coatings produced from the above composition exhibited excellent buffer and beer pasteurization resistance.

A sample of the above water-based coating composition was drawn down on treated aluminum in a 3 mil thickness and cured as mentioned above. The cured coating was then tested utilizing several standard tests employed in evaluating container coatings. Test results were as follows:

| | |
| --- | --- |
| Pencil hardness | H |
| Dye stain* | 4 |
| Cross hatch adhesion | Excellent |
| Wedge bend flexibility | 90 mm failure |
| Buffer resistance | Excellent |
| Beer pasteurization resistance | Excellent |

*Measures state of cure on a rating scale of 0 to 10 wherein 0 is excellent and 10 is poor. Values of 5 or less are considered to indicate a good state of cure.

According to the provisions of the Patent Statutes, there are described above the invention and what are now considered to be its best embodiments. However, within the scope of the appended claims, it is to be understood that the invention can be practiced otherwise than as specifically described.

I claim:

1. A curable, carboxyl-containing precondensate prepared by reacting at a temperature from about 200° to about 350° F. (1) a polyglycidyl ether of a polyphenol with (2) an amino-substituted aromatic carboxylic acid selected from the class consisting of anthranilic acid, p-aminobenzoic acid, m-aminobenzoic acid, 3-amino-p-toluic acid, 3-amino-salicylic acid, 3-amino-4-methoxybenzoic acid, 6-amino-m-toluic acid, 3-amino-4-chlorobenzoic acid, 2-amino-5-nitrobenzoic acid, 2-nitro-5-aminobenzoic acid and 5-amino-isophthalic acid; said precondensate having an acid number of at least 15.

2. The precondensate of claim 1 wherein the polyglycidyl ether of a polyphenol is a glycidyl polyether of 2,2-bis(4-hydroxyphenyl)propane.

3. The precondensate of claim 1 wherein the amino-substituted aromatic carboxylic acid is selected from the class consisting of anthranilic acid, p-aminobenzoic acid and m-aminobenzoic acid.

4. The precondensate of claim 3 wherein the amino-substituted aromatic carboxylic acid is p-aminobenzoic acid.

5. A curable composition comprising the polycondensate of claim 1 and a polyamide.

6. An anionic aqueous composition comprising water and an at least partially base neutralized reaction product of:
 (a) a polyglycidyl ether of a polyphenol having a 1,2-epoxy equivalency greater than 1.0; and
 (b) an aromatic amino acid selected from the class consisting of an anthranilic acid, p-amino benzoic acid, m-amino benzoic acid, 3-amino-p-toluic acid, 3-amino-4-methoxy benzoic acid, 6-amino-m-toluic acid, 3-amino-4-chloro-benzoic acid, 2-amino-5-nitro benzoic acid, 2-nitro-5-amino benzoic acid, 5-amino isophthalic acid;

said reaction product having unreacted carboxylic acid groups which are neutralized with base to form anionic salt groups.

7. The aqueous composition of claim 6 wherein the equivalent ratio of epoxy groups in said polyglycidyl ether to amine groups in said amino acid is between 1:0.20 and 1:1.25.

8. The aqueous composition of claim 6 wherein said reaction product is at least partially neutralized with a volatile base.

9. The aqueous composition of claim 8 wherein said base is an amine.

10. The aqueous composition of claim 6 wherein said polyphenol is bisphenol A.

11. The aqueous composition of claim 6 wherein said amino acid is anthranilic acid.

12. The aqueous composition of claim 6 wherein said amino acid is p-aminobenzoic acid.

13. The aqueous composition of claim 6 wherein said amino acid is m-aminobenzoic acid.

14. An anionic aqueous composition comprising water and:
   (a) an at least partially base neutralized reaction product of:
      (1) a polyglycidyl ether of a polyphenol having a 1,2-epoxy equivalency of greater than 1.0; and
      (2) an aromatic amino acid selected from the class consisting of an anthranilic acid, p-amino benzoic acid, m-amino benzoic acid, 3-amino-p-toluic acid, 3-amino-4-methoxy benzoic acid, 6-amino-m-toluic acid, 3-amino-4-chloro-benzoic acid, 2-amino-5-nitro benzoic acid, 2-nitro-5-amino benzoic acid, 5-amino isophthalic acid;
   said reaction product having unreacted carboxylic acid groups which are neutralizable with base to form anionic salt groups; and
   (b) a resin selected from the group consisting of hydrocarbon resins, water-soluble acrylic resins, acrylic polymer emulsions, aqueous dispersions of amide-containing acrylic interpolymers, or combinations thereof.

15. The aqueous composition of claim 14 further containing a curing agent.

16. The aqueous composition of claim 14 wherein said composition based on total weight of (a) and (b) contains from about 5 to about 95 percent by weight of (a) and from about 95 to about 5 percent by weight of (b).

17. The aqueous composition of claim 14 wherein said resin is an acrylic polymer emulsion.

18. The aqueous composition of claim 14 wherein said resin is an aqueous dispersion of an amide-containing acrylic interpolymer.

19. The aqueous composition of claim 14 further containing a pigment or pigments.

* * * * *